(12) United States Patent
Cai et al.

(10) Patent No.: US 8,121,624 B2
(45) Date of Patent: Feb. 21, 2012

(54) MESSAGE SPOOFING DETECTION VIA VALIDATION OF ORIGINATING SWITCH

(75) Inventors: Yigang Cai, Naperville, IL (US); Alok Sharma, Lisle, IL (US)

(73) Assignee: Alcatel Lucent, Paris (FR)

( * ) Notice: Subject to any disclaimer, the term of this patent is extended or adjusted under 35 U.S.C. 154(b) by 796 days.

(21) Appl. No.: 11/492,336

(22) Filed: Jul. 25, 2006

(65) Prior Publication Data

US 2008/0026778 A1    Jan. 31, 2008

(51) Int. Cl.
*H04W 4/00* (2009.01)
*H04B 1/38* (2006.01)

(52) U.S. Cl. ............... 455/466; 455/560; 455/412.1; 709/206

(58) Field of Classification Search .......... 455/466, 455/412.1, 412.2, 414.2, 414.3, 560; 709/223, 709/224, 206, 207; 370/349
See application file for complete search history.

(56) References Cited

U.S. PATENT DOCUMENTS

| | | | | |
|---|---|---|---|---|
| 2003/0067908 A1* | 4/2003 | Mattaway et al. | ............ | 370/352 |
| 2006/0211406 A1* | 9/2006 | Szucs et al. | ............ | 455/410 |
| 2007/0254681 A1* | 11/2007 | Horvath et al. | ............ | 455/466 |
| 2008/0004047 A1* | 1/2008 | Hill et al. | ............ | 455/466 |

FOREIGN PATENT DOCUMENTS

EP    1457905 A3    9/2004

OTHER PUBLICATIONS

Universal Mobile Telecommunications System (UMTS) 3G Security; Network Domain Security (NDS); Mobile Application Part (MAP) application layer security (3GPP TS 33.200 Version 6.1.0 Release 6); ETSI TS 133 200 ETSI Standards, LIS, vol. 3-SA3, No. V6.1.0, Mar. 1, 2005, XP014028217 ISSN: 0000-0001, p. 19, Line—p. 21, last line.
3rd Generation Partnership Project; Technical Specification Group Services and System Aspects; Support of SMS and MMS over generic 3GPP IP access (Release 7); 3GPP TR 23.804 ETSI Standards, LIS, vol. 3-SA2, No. V7.1.0, Sep. 1, 2005 , XP014031515 ISSN: 0000-0001 Figure 8-9.
Digital cellular telecommunications system (Phase 2+); Universal Mobile Telecommunications System (UMTS); Mobile Application Part (MAP) specification (3GPP TS 29.002 version 6.14.0 Release 6); ETSI TS 129002, ETSI Standards, LIS, vol. 3-CN2; 3-CN4, No. V6.14.0, Jun. 1, 2006, pp. 670-725, XP002478716, ISSN: 0000-0001 Figure 23.2/1, Figure 23.3/1.

* cited by examiner

Primary Examiner — George Eng
Assistant Examiner — Marcos Torres
(74) Attorney, Agent, or Firm — Carmen Patti Law Group, LLC

(57) ABSTRACT

Message spoofing is detected by an anti-spoofing application comparing a trusted switch address (i.e., corresponding to an originating switch having processed an incoming message) to an "affiliated" address (i.e., corresponding to a switch serving the location of the identified sender). Message spoofing is detected if the trusted address differs from the affiliated address.

16 Claims, 6 Drawing Sheets ding switch. Where the source terminal is a wireless device, for example, the originating switch may comprise an MSC. Where the source terminal is an SIP phone, the originating switch may comprise a Call Session Control Function (CSCF). The switching element 116 serving the destination terminal 104 is referred to as the terminating switch. Of course, it will be appreciated that the originating and terminating switches are described as different switches for ease of illustration, but they may actually comprise the same switching element serving both the source and destination terminals.

MESSAGE SPOOFING DETECTION VIA VALIDATION OF ORIGINATING SWITCH

FIELD OF THE INVENTION

This invention relates generally to communication networks supporting messaging services and, more particularly, to a method for detecting message 'spoofing' based on validation of the originating switch.

BACKGROUND OF THE INVENTION

Many communication networks support electronic messaging services, for example and without limitation, Short Message Service (SMS), Multimedia Message Service (MMS), voicemail or e-mail. Generally, irrespective of network topology and message format, communication networks use some sort of message application server (e.g., Short Message Service Center (SMSC) or Multimedia Message Service Center (MMSC)) for processing electronic messages. Typically, the application servers use indicia of source and destination addresses (for example, directory numbers, IP addresses, e-mail addresses or the like) extracted from the message header to process the message. For example, SMSCs and MMSCs may use source and destination addresses extracted from the message header for routing, billing, caller ID or other purposes.

Increasingly, a problem encountered in the field of electronic messaging is the practice of message 'spoofing' (i.e., a sending party prefacing its messages with a falsified source address) so as to appear to originate from a sender other than the true sender and thereby disguise the identity of the true sender. For example, message spoofing may be practiced in the context of "spam" messages to mislead the receiving party as to the source of the message. As another example, spoofing technology can be used by an imposter to grant access to a spoofed party's voicemail account. Message spoofing might also be practiced in attempt to divert or impede billing for electronic messaging services.

SUMMARY OF THE INVENTION

This problem is addressed and a technical advance is achieved in the art by a feature for detecting message spoofing based on validation of a switching element ("originating switch") associated with the indicated sender.

In one embodiment, there is provided a method of detecting instances of message spoofing, wherein an incoming message includes indicia of sender and in the case of message spoofing will appear to originate from a sender other than the true sender. The method comprises an anti-spoofing application inspecting a message header of the incoming message to identify a device address corresponding to an originating switch having processed the incoming message, defining a trusted address. The anti-spoofing application further queries a location register associated with the identified sender to identify a device address corresponding to a switch serving the identified sender, defining an affiliated address. The anti-spoofing application compares the trusted address and the affiliated address and message spoofing is detected if the trusted address differs from the affiliated address.

In one exemplary embodiment of the invention, the anti-spoofing application resides in a Short Message Service Center (SMSC) processing an incoming SMS message. The SMSC identifies the trusted address by inspecting a message header of the incoming SMS message for indicia of an originating Mobile Switching Center (MSC) and identifies the affiliated address by querying a location register associated with the identified sender for indicia of an MSC serving the identified sender.

In another exemplary embodiment of the invention, the anti-spoofing application resides in a Short Message Service Center Application Server (SMSC-AS) of an IMS network processing an incoming SIP message. The SMSC-AS identifies the trusted address by inspecting a message header of the incoming SIP message for indicia of an originating Call Session Control Function (CSCF) and identifies the affiliated address by querying a location register associated with the identified sender for indicia of the CSCF serving the identified sender.

BRIEF DESCRIPTION OF THE DRAWINGS

The foregoing and other advantages of the invention will become apparent upon reading the following detailed description and upon reference to the drawings.

DESCRIPTION OF THE PREFERRED EMBODIMENT(S)

Figure 1:
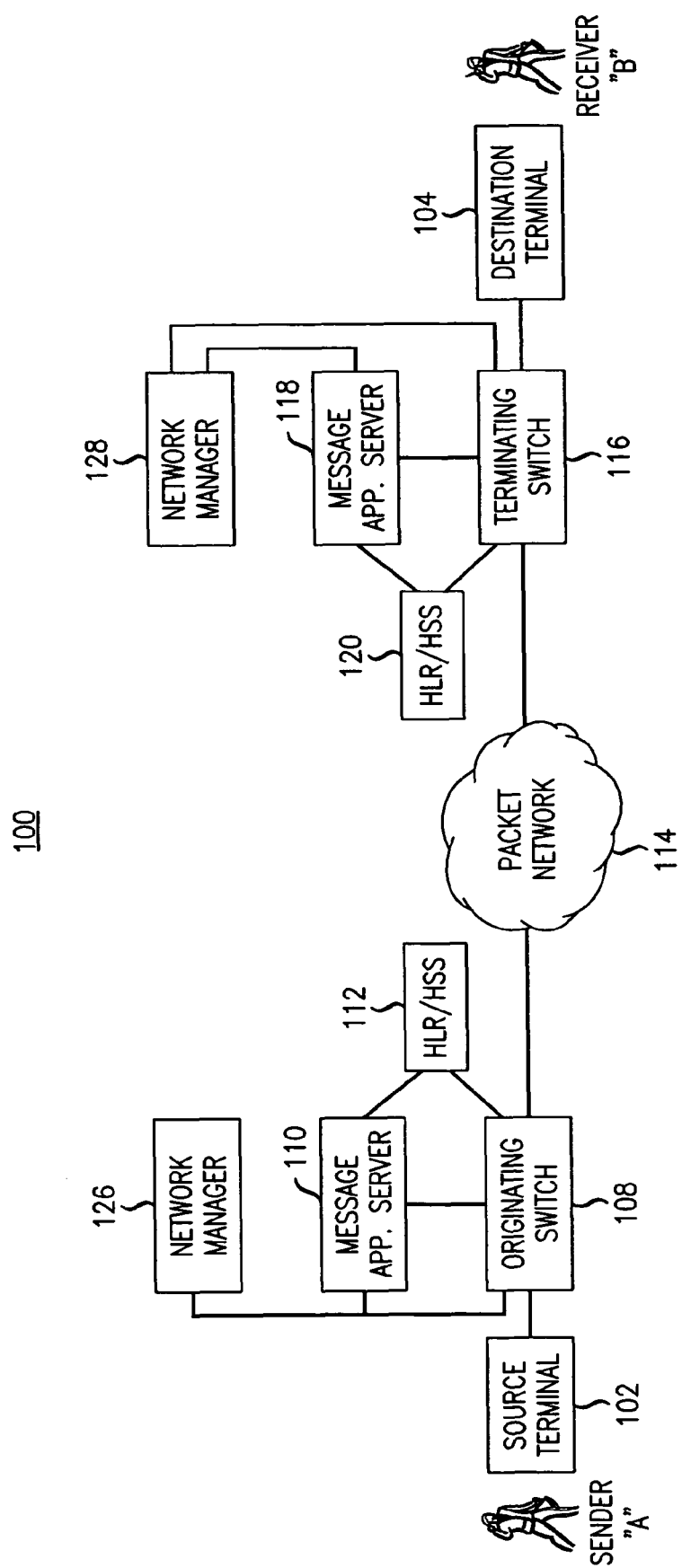
FIG. 1 illustrates a communication network adapted for providing electronic messaging services in an exemplary embodiment of the invention.

FIG. 1 illustrates a communication network 100 in an exemplary embodiment of the invention. Communication network 100 may represent a wireline network, an IP Multimedia Subsystem (IMS) network, a packet-based network (IP network), a wireless network, or another type of network. Communication network 100 is adapted to provide an electronic messaging service, such as an SMS messaging service, MMS messaging service, voicemail or e-mail between a source terminal 102 (associated with sender "A") and a destination terminal 104 (associated with receiver "B"). The source and destination terminals 102, 104 may comprise any device having the capacity to send and receive electronic messages through communication network 100 including, without limitation, a wireline phone, a wireless (mobile) phone, a PDA, a PC, a VoIP phone or a SIP phone.

The source and destination terminals 102, 104 are logically connected to switching elements 108, 116 that are operable to process and switch calls and messages, including SMS or MMS messages between the source and destination terminals. Conventionally (as shown), the switching element 108 serving the source terminal 102 is referred to as the originating switch and the switching element 116 serving the destination terminal 104 is referred to as the terminating switch. The switches 108, 116 are connected by a packet network 114 (e.g., an IP network).

The switches 108, 116 will generally vary depending on the network topology in which they each operate. For example, the switches 108, 116 may comprise: in a wireline network, a central office switch such as a 5ESS® switching system; in a wireless network, a Mobile Switching Center (MSC) such as an AUTOPLEX™ switching system; and in an IMS network, a Call Session Control Function (CSCF) such as may reside in a Softswitch or Media Gateway. As will be appreciated, the switching elements 108, 116 may be configured for operation with generally any suitable circuit, cell, or packet switching and routing technologies, including but not limited to Internet Protocol (IP) and Asynchronous Transfer Mode (ATM) technologies.

The communication network 100 is further illustrated as including, on both the originating and terminating sides, a message application server, a Home Location Register (HLR)/Home Subscriber Server (HSS) and a network manager. The message application servers are denoted by reference numerals 110, 118; the HLR/HSS by reference numerals 112, 120 and the network manager by reference numerals 126, 128. As will be appreciated, each of these devices are functional elements that may reside individually or collectively in one or more physical structures or may be implemented in software. Further, the devices may take different forms depending on the network topology and the type of electronic messaging supported by the communication network 100.

The message application servers 110, 118 are adapted to receive and process messages between source and destination terminals. The message application servers may comprise, for example and without limitation: in a wireless SMS network, Short Message Service Centers (SMSCs); in an MMS network, Multimedia Message Service Centers (MMSC); and in an IMS-based network, SMSC Application Servers (SMSC-AS) or MMSC Application Servers (MMSC-AS).

The HLR/HSS 112, 120 are location registers that store subscriber data and location information associated with source and destination terminals 102, 104. Conventionally, the term HLR refers to a location register of a wireless network and the term HSS refers to a location register of an IMS network. During message processing, the message application servers communicate with the HLR/HSS to obtain address information associated with the source and destination terminals 102, 104, including address information of the originating and terminating switches 108, 116 that are serving terminals 102, 104. The message application servers use this information for routing and billing and, according to principles of the present application, to detect attempted message spoofing by an originating party.

The network manager elements 126, 128 operate to optimize and manage the originating and terminating sides of the network 100 by performing tasks including, without limitation, gathering, analyzing, displaying and/or reporting statistics indicative of the health of the network and the quality of service being provided; and maintaining statistics characterizing the traffic being carried by the network. For example, in the context of the present application, the network manager elements gather and maintain statistics regarding incidents of message spoofing as reported by the messaging application servers.

Figure 2:
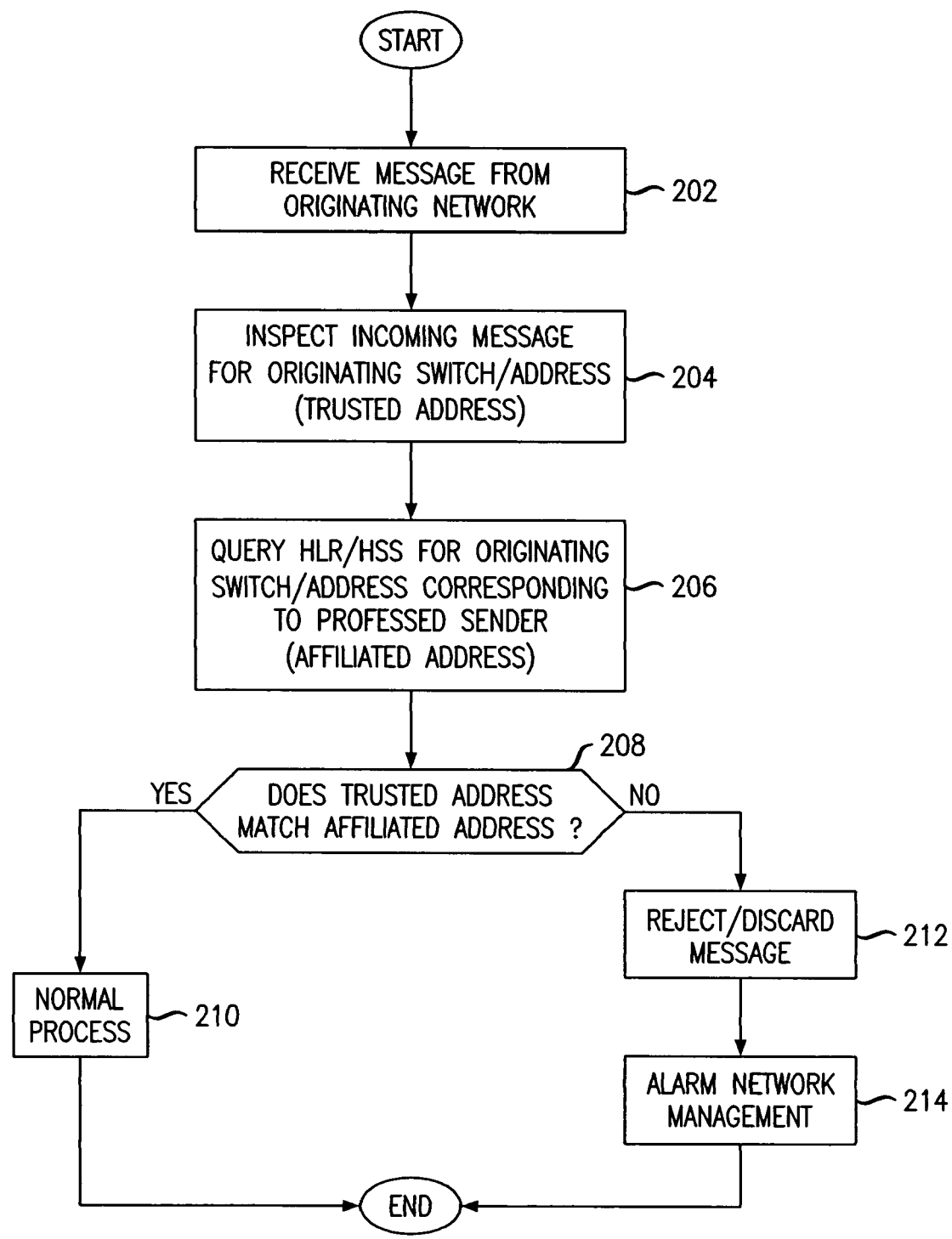
FIG. 2 is a flowchart showing steps performed within a terminating network to detect message spoofing based on authentication of an originating switch according to an embodiment of the present invention.

FIG. 2 is a flow chart illustrating a method of providing electronic messaging service in an exemplary embodiment of the invention, whereby message spoofing is detected based on authentication of an originating switch. The steps shown in FIG. 2 are implemented by an anti-spoofing application residing in the message application server 118 (e.g., SMSC or SMSC-AS) of the terminating network. Optionally, service providers may activate the anti-spoofing application as a fee-based service (i.e., to collect additional revenue) or may implement as a part of basic service for all customers. The steps of FIG. 2 will be described with reference to the elements of communication network 100 in FIG. 1, but the method is not limited to the network or elements of FIG. 1.

At step 202, the terminating message application server 118 receives a message from the originating network. The message may comprise, for example, an SMS, MMS, voice-mail or e-mail message originated by sender "A" via source terminal 102 (or in the case of message spoofing, falsely appearing to originate from sender "A") and directed to receiver "B" via destination terminal 104.

In the exemplary network of FIG. 1, a message from sender "A" is initially communicated from source terminal 102 to originating switch 108. The message typically includes a message header with directory number, IP address or other identifier associated with the source and destination terminals 102, 104. Upon receiving the message, the originating switch 108 inserts an identifier of itself (e.g., ID number) and forwards the message to the originating application server 110, which in turn queries the HLR/HSS 120 associated with receiver "B" to determine the location of destination terminal 104. HLR/HSS 120 maintains location information associated with destination terminal 104 comprising, for example, an identification of the terminating switch 116 that is presently serving destination terminal 104; and HLR/HSS 120 provides this information to application server 108 responsive to the query. The application server 108 thereafter transmits the message to the terminating switch 116 and the terminating switch 116 forwards the message to terminating application server 118.

Note that in the case of a message spoofing, a message falsely indicating source terminal 102 is sourced by an imposter terminal (not shown) and processed by an originating switch (not shown) of a network serving the imposter terminal. The originating switch inserts an identifier of itself and forwards the message to an application server, similarly to the case of a legitimate message except the originating switch and application server most typically reside in a foreign network relative to the spoofed source terminal. Thereafter, the application server queries HLRIHSS 120 to identify the location of destination terminal and transmits the spoofed message to terminating application server 118 as in the case of a legitimate message. Ultimately, when the spoofed message is received by the terminating application server, it will include a spoofed source terminal identifier but a valid originating switch identifier. That is, the originating switch identifier can be trusted as identifying the actual switch from which the message originated.

At step 204, the terminating message application server 118 inspects the incoming message to identify the originating switch address. This switch address is referred to herein as a "trusted" address since it can be trusted as identifying the actual switch from which the message originated. For example, a legitimate message from sender "A" via source terminal 102 will include the address of switch 108 since switch 108 will have processed the message and inserted its own address in the message header; conversely, a spoofed message from an imposter terminal will include the address of the foreign switch (not shown) that processed the spoofed message.

At step 206, the terminating application server 118 queries the HLR/HSS 112 associated with source terminal 102 to determine the switch (i.e., switch 108) that is serving the professed sender "A." HLR/HSS 112 maintains location information associated with terminal 102 including an identification of the switch 108 that is presently serving terminal 102; and HLR/HSS 112 provides this information to application server 118 responsive to the query. This switch address is referred to herein as an "affiliated" address since it identifies the switch that is affiliated with the professed sender "A." Note that the switch identified by the affiliated address may or may not correspond to the actual originating switch as identified in the trusted address.

At step 208, the terminating application server 118 compares the affiliated and trusted address to detect the presence or absence of spoofing. If the affiliated and trusted addresses match (i.e., they identify the same switch), the message is considered legitimately sourced from source terminal 102 and the message is processed and delivered to destination terminal 104 as normal at step 210. However, if the affiliated and trusted addresses differ (i.e., they identify different switches), the message is considered to be a spoofing attempt and is discarded/rejected at step 212 without delivering to the destination terminal 104. In one embodiment, at step 214, an alarm is provided to network management 126 or 128 to report the spoofing attempt.

Figure 3:
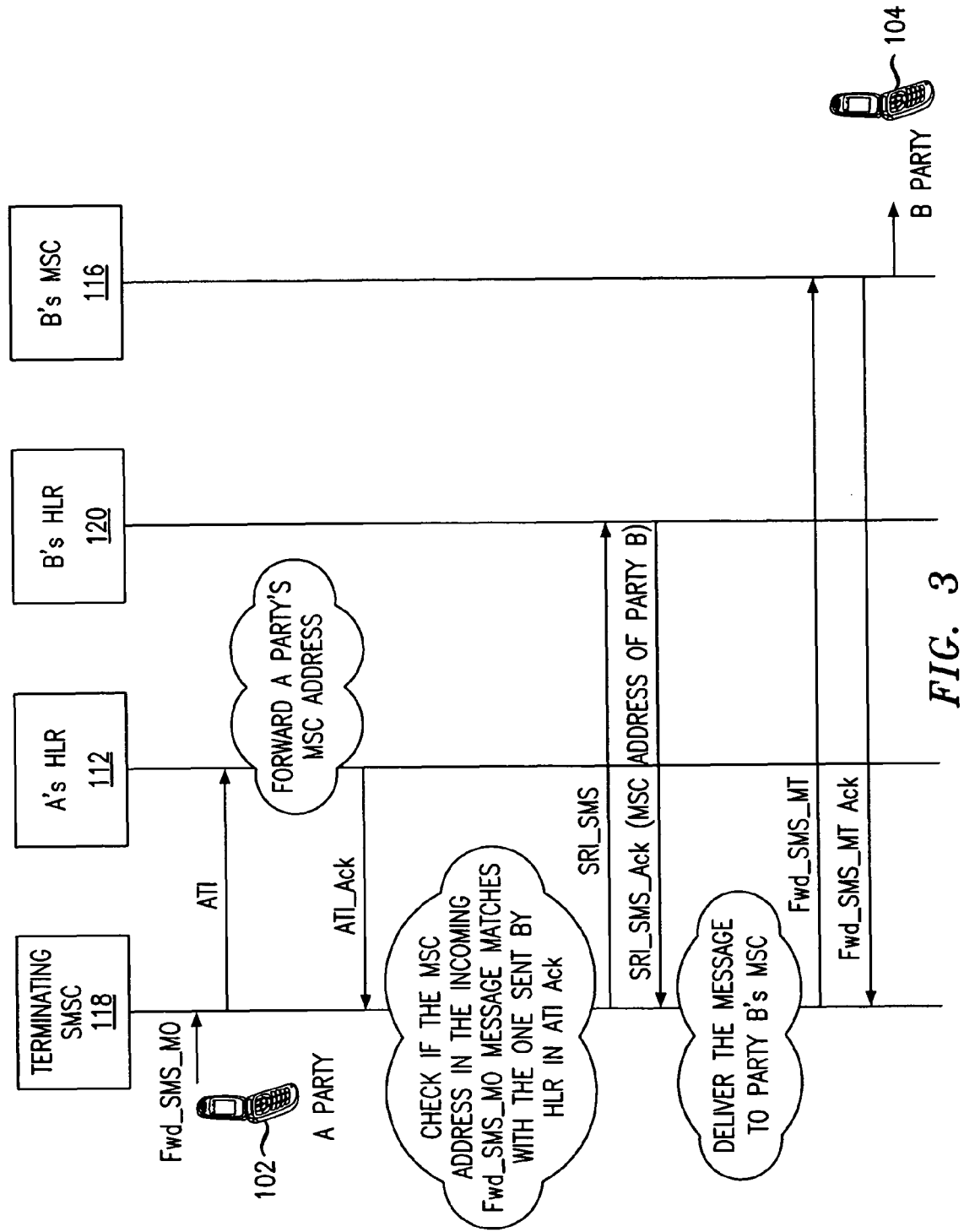
FIG. 3 is a message sequence chart illustrating SMS message handling by a terminating SMSC in a wireless network in the case where message spoofing is not detected and the message is delivered to the receiving party.
Figure 4:
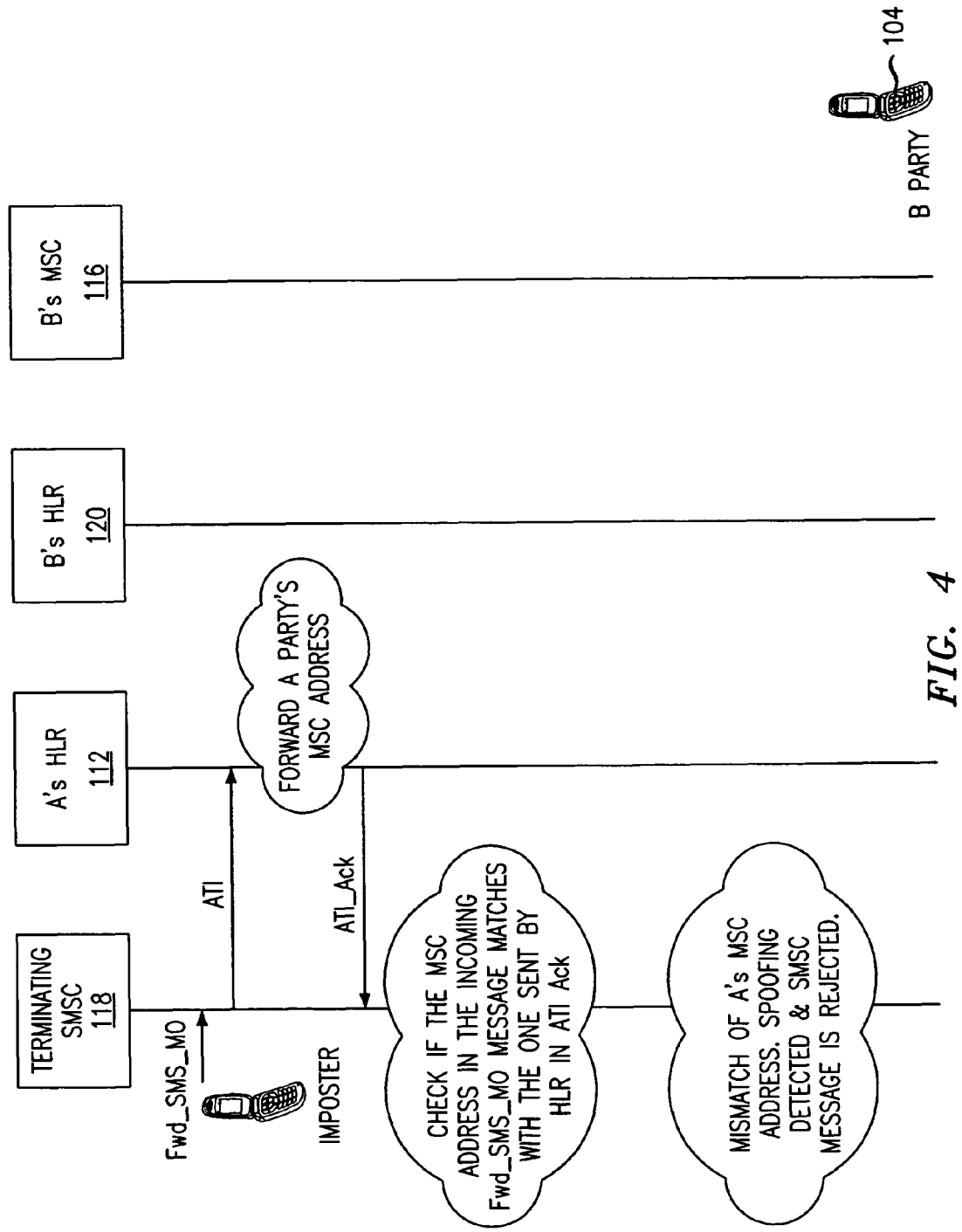
FIG. 4 is a message sequence chart illustrating SMS message handling by a terminating SMSC in a wireless network in the case where message spoofing is detected and the message is not delivered to the receiving party.

FIG. 3 and FIG. 4 are message sequence charts illustrating SMS message handling by a terminating SMSC in a wireless network in an exemplary embodiment of the invention. The message charts refer to elements of FIG. 1 where applicable.

Referring initially to FIG. 3, terminating SMSC 118 receives an SMS message (Fwd_SMS_MO) originated from sender "A" using source terminal 102. The message includes a message header (not shown) that identifies terminal 102 as the source of the message and terminal 104 as the intended recipient of the message. The message header also includes an identifier of the originating MSC 108 having initially processed the message and having inserted its own address in the message header (i.e., the "trusted" address).

SMSC 118 sends a query comprising an Any Time Interrogation (ATI) message to sender A's HLR 112 to request sender A's serving MSC address (i.e., the "affiliated" address). Responsive to the query, HLR 112 finds sender A's location and its serving MSC address (i.e., MSC 108) and sends an ATI_Ack message to so inform SMSC 118.

SMSC 118 next compares the originating MSC address identified in the Fwd_SMS_MO message (i.e., the trusted address) to the MSC address identified in the ATI_Ack message (i.e., the affiliated address). In the exemplary case of FIG. 3, the trusted and affiliated addresses identify the same switch (e.g., MSC 108) and thus SMSC 118 considers the message to be legitimately sourced from source terminal 102. Accordingly, SMSC 118 continues to process the message as normal.

SMSC 118 then sends an SRI_SMS message to recipient B's HLR 120 to request recipient B's serving MSC address. Responsive to the query, HLR 120 finds recipient B's location and its serving MSC address (i.e., MSC 116) and sends an SRI_SMS_Ack message to so inform SMSC 118.

SMSC 118 then delivers the message Fwd_SMS_MT to B's MSC 116. B's MSC 116 returns an acknowledgment message Fwd_SMS_MT_Ack to SMSC 118 and delivers the message via wireless interface to party B at recipient terminal 104.

Now turning to FIG. 4, there is shown a message sequence in which message spoofing is detected by the terminating SMSC 118. In this example, an SMS message (Fwd_SMS_MO) is originated from an imposter posing as sender A. The message includes a message header (not shown) that falsely identifies terminal 102 as the source of the message and terminal 104 as the intended recipient of the message. The message header also includes an identifier of the foreign MSC having processed the message and having inserted its own address in the message header (i.e., the "trusted" address).

SMSC 118 sends a query comprising an ATI message to sender A's HLR 112 to request sender A's serving MSC address (i.e., the "affiliated" address). Responsive to the query, HLR 112 finds sender A's location and its serving MSC address (i.e., MSC 108) and sends an ATI_Ack message to so inform SMSC 118.

SMSC 118 next compares the originating MSC address identified in the Fwd_SMS_MO message (i.e., the trusted address) to the MSC address identified in the ATI_Ack message (i.e., the affiliated address). In the exemplary case of FIG. 4, the trusted and affiliated addresses differ and thus SMSC 118 considers the message to be a spoofing attempt that falsely identifies terminal 102 as the source. Having detected the spoofing attempt, SMSC 118 rejects the message and does not attempt to locate or deliver the message to party B.

Figure 5:
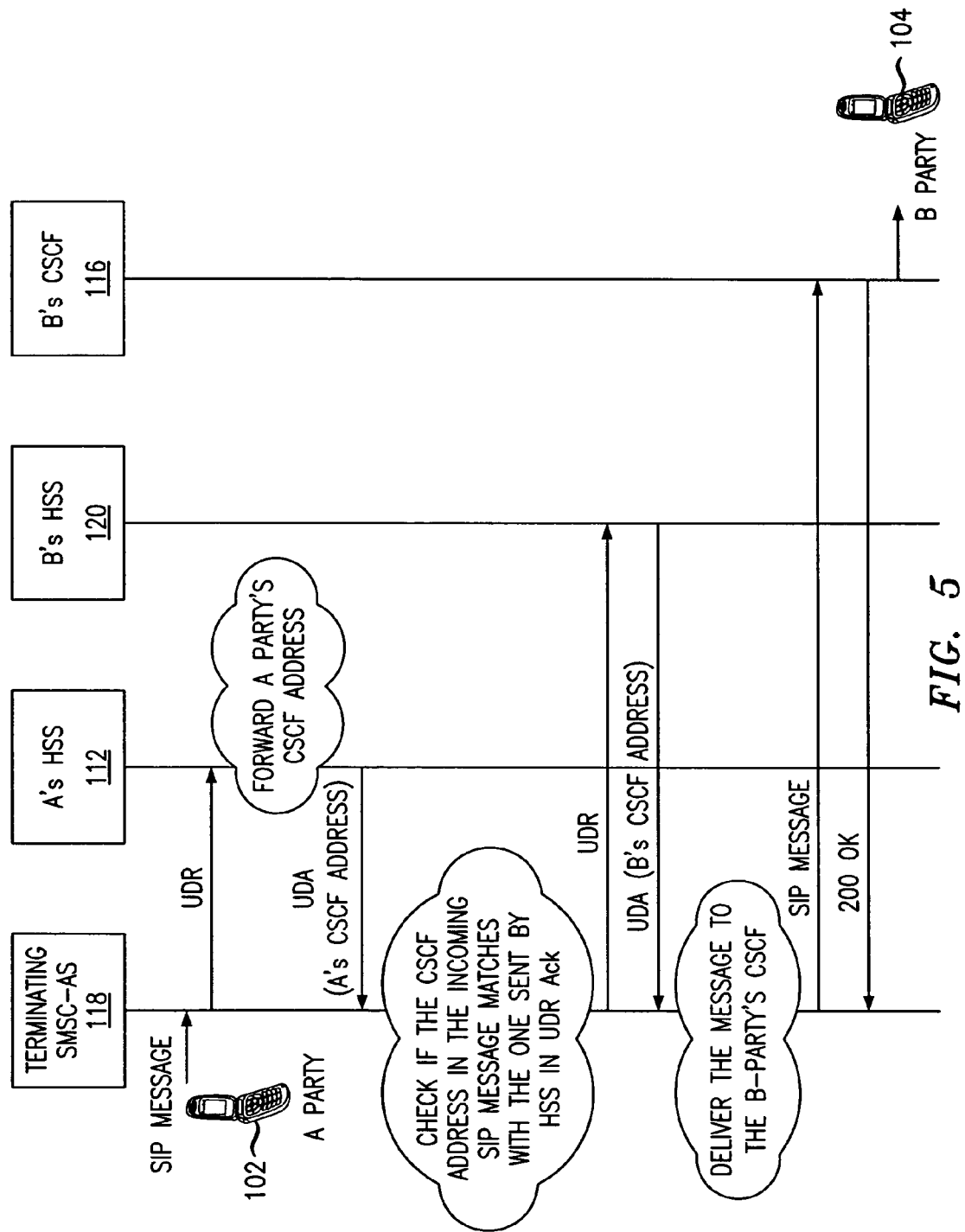
FIG. 5 is a message sequence chart illustrating SMS message handling by an SMSC application server in an IMS network in the case where message spoofing is not detected and the message is delivered to the receiving party.
Figure 6:
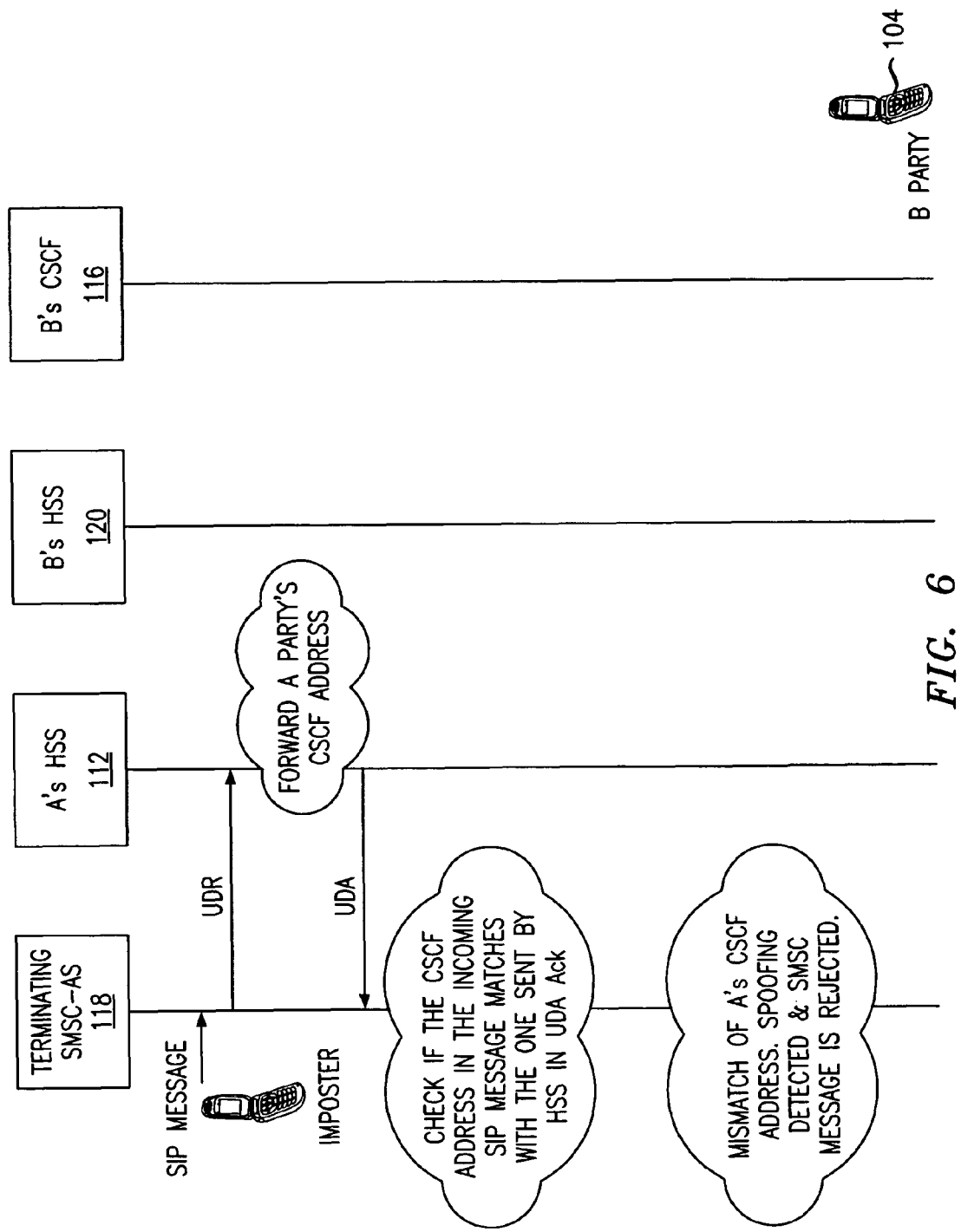
FIG. 6 is a message sequence chart illustrating SMS message handling by an SMSC application server in an IMS network in the case where message spoofing is detected and the message is not delivered to the receiving party.

FIG. 5 and FIG. 6 are message sequence charts illustrating SMS message handling by a SMSC application server (SMSC-AS) in an IMS network in an exemplary embodiment of the invention. The message charts refer to elements of FIG. 1 where applicable. In FIG. 5, terminating SMSC-AS 118 receives a SIP message originated from sender "A" using source terminal 102. The message includes a message header (not shown) that identifies terminal 102 as the source of the message and terminal 104 as the intended recipient of the message. The message header also includes an identifier of the originating Call Session Control Function (CSCF) having initially processed the message and having inserted its own address in the message header (i.e., the "trusted" address).

SMSC-AS 118 sends a query comprising a User Data Request (UDR) message to sender A's HSS 112 to request sender A's serving CSCF address (i.e., the "affiliated" address). Responsive to the query, HSS 112 finds sender A's location and its serving CSCF address (i.e., CSCF 108) and returns a User Data Answer (UDA) message to so inform SMSC-AS 118.

SMSC-AS 118 next compares the CSCF address identified in the incoming SIP message (i.e., the trusted address) to the CSCF address identified in the UDA message (i.e., the affiliated address). In the exemplary case of FIG. 5, the trusted and affiliated addresses identify the same CSCF (e.g., CSCF 108) and thus SMSC-AS 118 considers the message to be legitimately sourced from source terminal 102. Accordingly, SMSC-AS 118 continues to process the message as normal.

SMSC-AS 118 then sends a UDR message to recipient B's HSS 120 to request recipient B's serving CSCF address. Responsive to the query, HSS 120 finds recipient B's location and its serving CSCF address (i.e., CSCF 116) and returns a UDA message to so inform SMSC-AS 118.

SMSC-AS 118 then delivers the SIP message to CSCF 116. B's CSCF 116 returns an acknowledgment message (200 OK) to SMSC-AS 118 and delivers the message to party B at recipient terminal 104.

FIG. 6 shows an IMS message sequence in which message spoofing is detected by the terminating SMSC-AS 118. In this example, a SIP message is originated from an imposter posing as sender A. The message includes a message header (not shown) that falsely identifies terminal 102 as the source of the message and terminal 104 as the intended recipient of the message. The message header also includes an identifier of the foreign CSCF having processed the message and having inserted its own address in the message header (i.e., the "trusted" address).

SMSC-AS 118 sends a query comprising a UDR message to sender A's HSS 112 to request sender A's serving CSCF address (i.e., the "affiliated" address). Responsive to the query, HSS 112 finds sender A's location and its serving CSCF address (i.e., CSCF 108) and sends a UDA message to so inform SMSC-AS 118.

SMSC-AS 118 next compares the CSCF address identified in the incoming SIP message (i.e., the trusted address) to the CSCF address identified in the UDA message (i.e., the affiliated address). In the exemplary case of FIG. 6, the trusted and affiliated addresses differ and thus SMSC-AS 118 considers the message to be a spoofing attempt that falsely identifies terminal 102 as the source. Having detected the spoofing attempt, SMSC-AS 118 rejects the message and does not attempt to locate or deliver the message to party B.

The specific exemplary embodiments of the present invention have been described with some aspects simplified or omitted. Those skilled in the art will appreciate variations from these embodiments that fall within the scope of the invention. For example and without limitation, the anti-spoofing application described in relation to FIG. 2 might be implemented wholly or partially in the terminating switch 116 (e.g., MSC or CSCF) or generally may reside in any element or combination of elements at the discretion of the service provider. The described embodiments are to be considered in all respects only as illustrative and not restrictive. The invention may be deployed in generally any wireline, wireless or IMS network including those with network topologies that differ from FIG. 1 or that use message sequences other than shown in FIG. 3 through FIG. 6. The scope of the invention is, therefore, indicated by the appended claims rather than by the foregoing description. All changes that come within the meaning and range of equivalency of the claims are to be embraced within their scope.

What is claimed is:

1. In a communication network supporting a short messaging service (SMS), wherein an incoming mobile terminated SMS message includes indicia of a sender as a source address in a message header of the mobile terminated SMS message and is subject to possible message spoofing so as to appear to originate from a sender other than the true sender, a method of detecting instances of message spoofing in mobile terminated SMS messages comprising:
    identifying the originating switch identification contained in signaling control information that accompanies the received mobile terminated SMS message, the originating switch identification not being part of said message header, the originating switch identification defining a trusted address of the originating switch in the communication network, the originating switch being the switch that terminates communications having a terminal of the sender as a destination and is the initial switch to first receive the incoming SMS message launched from the terminal of the sender;
    identifying the communication source address in the message header of the received SMS message;
    determining a first switch identification that serves said communication source address of the sender's terminal, the first switch identification being obtained from a location register assigned to monitor the location of the sender's terminal based on said source address, the first switch identification defining an affiliated address; and
    determining for the mobile terminated SMS message whether the trusted address differs from the affiliated address, wherein message origination spoofing is detected if the trusted address differs from the affiliated address.

2. The method of claim 1, wherein the originating switch is a mobile switching center (MSC) that supports direct communications with the sender's terminal.

3. The method of claim 1, further comprising the steps of:
    transmitting a location query using the communication source address of the sender's terminal as contained in the message header of the incoming message;
    receiving a reply from the location register assigned to track the location of the sender's terminal in response to the query where the reply contains the first switch identification reported by the location register as serving the sender's terminal.

4. The method of claim 1, further comprising blocking the delivery of the incoming message if message origination spoofing is detected.

5. The method of claim 1, wherein all of the steps are performed by a terminating message application server.

6. The method of claim 5, wherein the origination switch which is a mobile switching center to a Short Message Service Center (SMSC) and the terminating message application server comprises the SMSC.

7. The method of claim 6, wherein the step of identifying the trusted address comprises inspecting the signaling control information that accompanies the incoming SMS message for indicia of an originating Mobile Switching Center (MSC), and wherein the step of determining the affiliated address comprises querying a location register associated with the source address of the sender for indicia of an MSC serving the identified sender.

8. The method of claim 1, wherein the indicia of the sender is contained in the message header of the incoming message where the message header is subject to alteration by the user's terminal.

9. The method of claim 8, wherein the origination switch identity and the first switch identification are not subject to alteration by the user's terminal.

10. The method of claim 8, wherein the indicia of the sender's terminal is contained in a mobile application part (MAP) of the electronic message that is subject to alteration by the user's terminal.

11. The method of claim 10, wherein the indicia of the origination switch is contained in the transaction capabilities application part of the electronic message and is not subject to alteration by the user's terminal.

12. A communication processing node in a communication network supporting short messaging service (SMS), wherein a mobile terminated SMS message includes indicia of a sender as a source address in a message header of the mobile terminated SMS message and is subject to possible message spoofing so as to appear to originate from a sender other than the true sender, the communication processing node detects instances of message spoofing in mobile terminated SMS messages and comprises:
    means for identifying the originating switch identification contained in signaling control information that accompanies the received mobile terminated SMS message, the originating switch identification not being part of said message header, the originating switch identification defining a trusted address of the originating switch in the communication network, the originating switch being the switch that terminates communications having a terminal of the sender as a destination and is the initial switch to first receive the incoming SMS message launched from the terminal of the sender;

means for identifying the communication source address in the message header of the received SMS message;

means for determining a first switch identification that serves said communication source address of the sender's terminal, the first switch identification being obtained from a location register assigned to monitor the location of the sender's terminal as identified by said source address, the first switch identification defining an affiliated address; and means for determining for the mobile terminated SMS message whether the trusted address differs from the affiliated address, wherein message origination spoofing is detected if the trusted address differs from the affiliated address.

13. The communication processing node of claim 12, comprising a terminating message application server.

14. The communication processing node of claim 13, wherein the originating switch is a mobile switching center and the terminating message application server comprises a Short Message Service Center (SMSC).

15. The communication processing node of claim 12, wherein the indicia of the sender is contained in the mobile application part (MAP) of the incoming message subject to alteration by the user's terminal.

16. The communication processing node of claim 15, wherein the origination switch address is contained in the transaction capabilities application part of the incoming message and is not subject to alteration by the user's terminal.

* * * * *